Figure 1A:
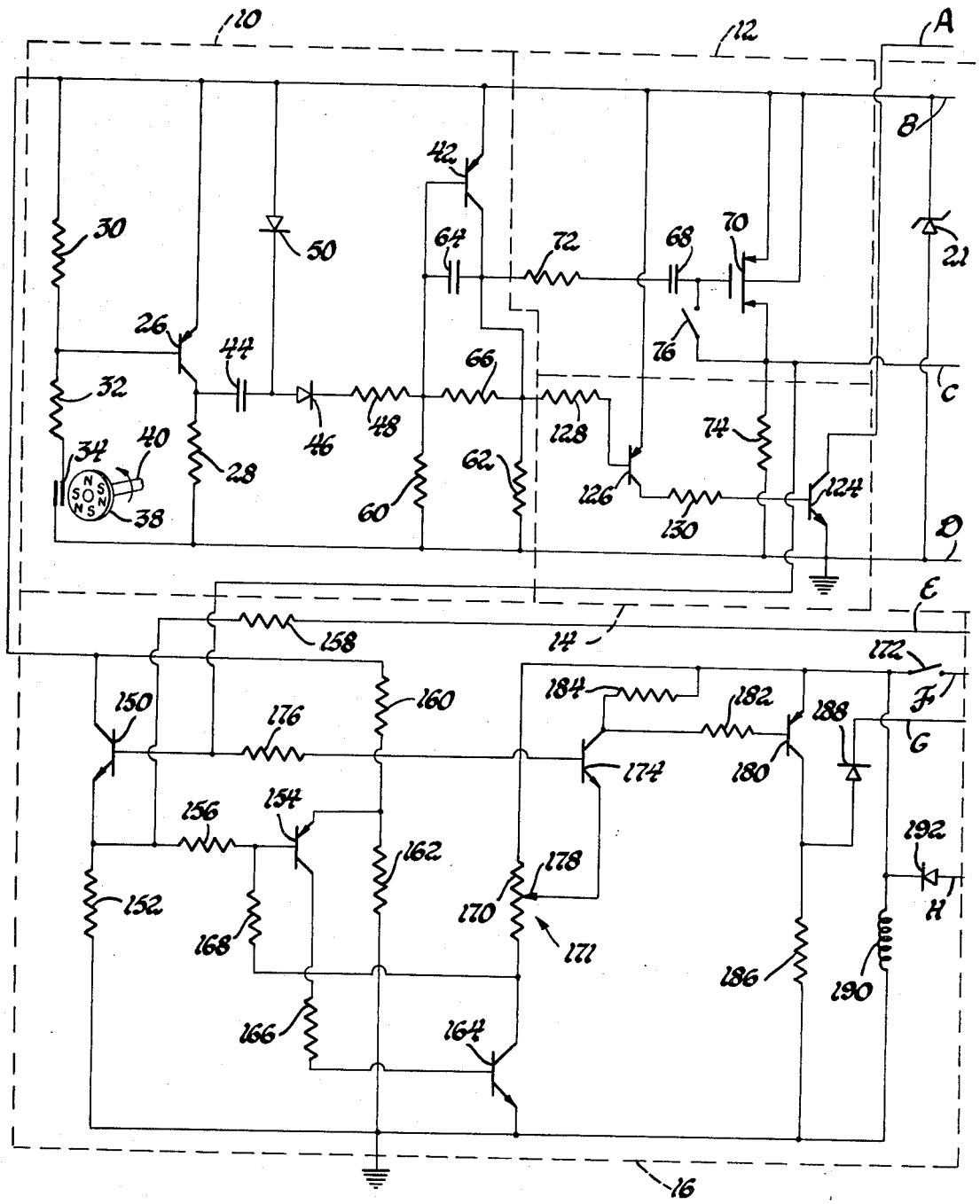

United States Patent
Colling et al.

[15] 3,705,639
[45] Dec. 12, 1972

[54] AUTOMATIC RE-ENGAGE CIRCUIT FOR AN ELECTRONIC SPEED CONTROL SYSTEM

[72] Inventors: Ronald L. Colling, Millington; Myron U. Trenne, Flint, both of Mich.

[73] Assignee: General Motors Corporation, Detroit, Mich.

[22] Filed: July 9, 1971

[21] Appl. No.: 161,055

[52] U.S. Cl. .....................180/105, 123/102, 317/5
[51] Int. Cl. ....................B60k 27/00, F02d 11/10
[58] Field of Search ............123/102; 180/105; 317/5

[56] References Cited

UNITED STATES PATENTS

| | | |
|---|---|---|
| 3,405,779 | 10/1968 | Johnston ..........................123/102 X |
| 3,476,205 | 11/1969 | Kato....................................180/105 |
| 3,533,383 | 10/1970 | Schultz................................123/102 |
| 3,575,256 | 4/1971 | Janig et al. ........................180/105 E |
| 3,645,241 | 2/1972 | Huntzinger...........................123/102 |

*Primary Examiner*—Gerald M. Forlenza
*Assistant Examiner*—R. B. Johnson
*Attorney*—C. R. Meland et al.

[57] ABSTRACT

An automatic re-engage circuit for an electronic vehicle speed control system which is armed when the speed control system is disengaged and the vehicle speed has decreased to a predetermined speed below the former cruise speed. After being armed, the automatic re-engage circuit is operative to automatically re-engage the speed control system when the vehicle is accelerated from the lower speed to the former cruise speed.

3 Claims, 2 Drawing Figures

AUTOMATIC RE-ENGAGE CIRCUIT FOR AN ELECTRONIC SPEED CONTROL SYSTEM

This invention relates to an automatic re-engage circuit for an electronic speed control system. More specifically, this invention relates to an automatic re-engage circuit which is armed when the vehicle speed control system is disengaged and thereby rendered inoperative and the vehicle speed decreases to a speed below the memorized speed and is operative when the vehicle is accelerated to the memorized speed to automatically re-engage the speed control system.

It is an object of this invention to provide an improved automatic re-engage circuit for an electronic cruise control system.

It is another object of this invention to provide an automatic re-engage circuit which is armed when the vehicle speed has decreased subsequent to the speed control system being disengaged and is operative when the speed of the vehicle is accelerated to the prior cruising speed to re-engage the electronic cruise control system.

It is another object of this invention to provide an automatic re-engage circuit for an electronic cruise control system which re-engages the electronic cruise control system as the vehicle speed approaches the former cruise speed from a lower speed but not a higher speed.

These objects are accomplished by an automatic re-engage circuit which receives the output of a memory and error amplifier circuit in the electronic cruise control system. When the electronic cruise control system is disengaged and thereby rendered inoperative to maintain the vehicle speed, the automatic re-engage circuit is responsive to the change in the output signal of the memory and error amplifier to arm itself when the speed of the vehicle has decelerated to a predetermined speed below the former cruise speed. Upon the acceleration of the vehicle to the former cruise speed, the automatic re-engage circuit generates a signal which is operative to re-engage the speed control system which is enabled to maintain the vehicle speed at the former cruising speed.

Figure 1B:
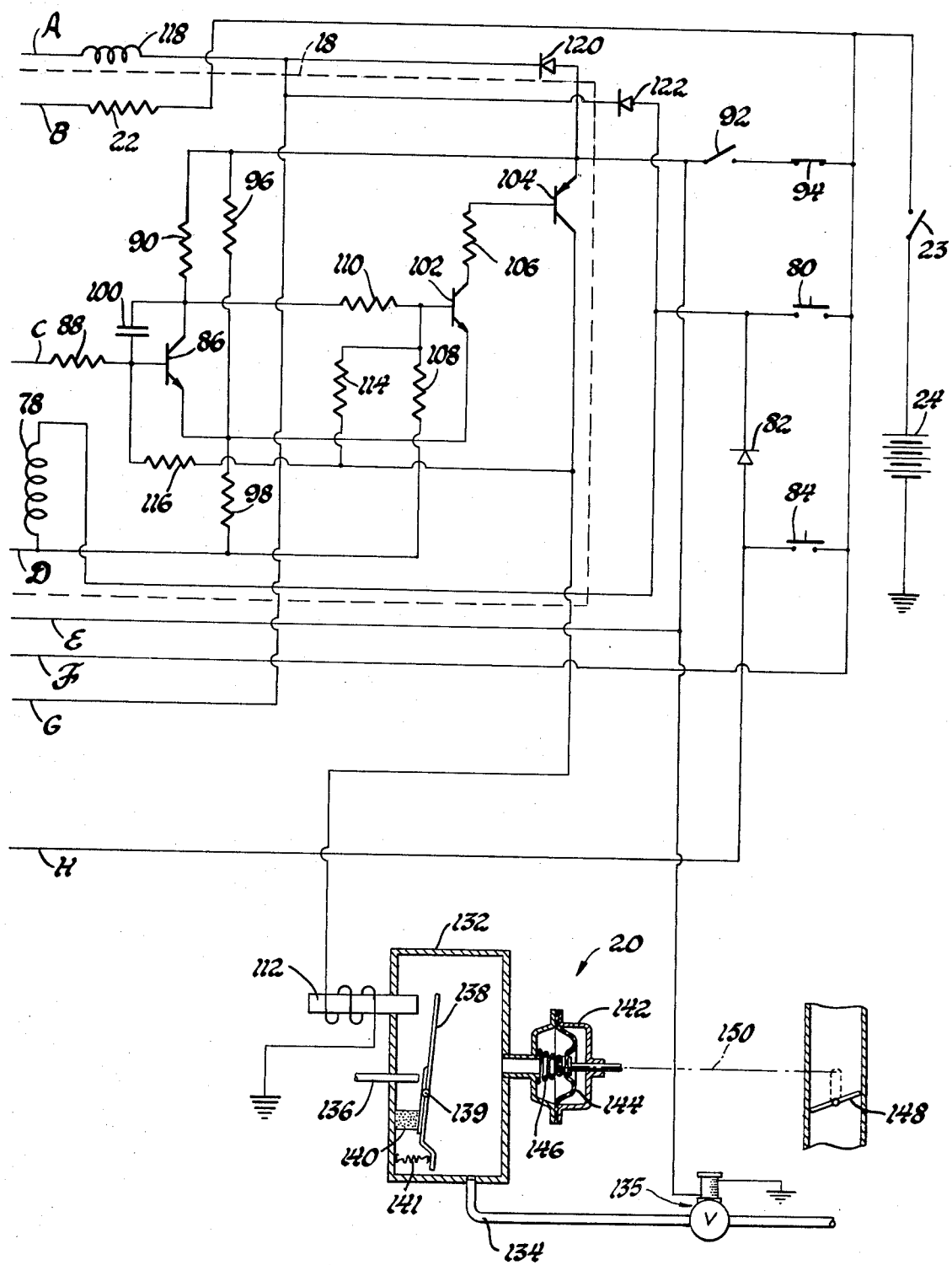

The invention may be best understood by reference to the following description of a preferred embodiment and the Figures in which:

Figs. 1a and 1b when taken together are a complete schematic electrical circuit diagram of a cruise control system made in accordance with this invention.

Before proceeding to a description of the circuit diagram of this invention it is pointed out that FIGS. 1a and 1b when taken in conjunction form a complete schematic electrical circuit diagram of the cruise control system of this invention. In this regard conductors which are connected together in FIGS. 1a and 1b have been designated by like letters A, B, C, D, E, F, G and H.

Referring to FIGS. 1a and 1b, the electronic vehicle speed control system is comprised basically of a speed tachometer circuit 10 which generates a signal representing the speed of the vehicle. The output of the speed tachometer 10 is supplied to a memory and error amplifier circuit 12 and to a speed switch 14. The function of the speed switch 14 is to prevent the engagement of the speed control system when the speed of the vehicle is below a predetermined minimum.

The memory and error amplifier circuit 12 supplies a signal to an automatic re-engage circuit 16 and a duty cycle oscillator 18. The output of the duty cycle oscillator 18 is supplied to a speed actuator 20 which is operative in response to the output of the duty cycle oscillator 18 to maintain the speed of the vehicle when the speed control circuit is engaged.

The automatic re-engage circuit 16 is responsive to the output of the memory and error amplifier circuit 12 to re-engage the speed control system when the speed control system is disengaged and the speed of the vehicle decreases below the cruise speed and is then accelerated to the former cruise speed.

The speed tachometer circuit 10 and the memory and error amplifier circuit 12 receives operating potential from across a Zener diode 21 which is connected in parallel with a current limiting resistor 22, a vehicle ignition switch 23 and a DC power source 24, which may be the vehicle battery. The negative terminal of the DC voltage source 24 is connected to ground. Hereinafter it will be assumed that the vehicle is operating with the ignition switch 23 closed.

The speed tachometer circuit 10 includes a signal conditioning PNP transistor 26 having its emitter electrode connected to the cathode of the Zener diode 21 and having its collector electrode connected to ground through an output resistor 28. The base electrode of the transistor 26 is connected to the junction of a pair of biasing resistors 30 and 32 which are connected in series with a magnetically operated reed switch 34 across the Zener diode 21. The reed switch 34 is positioned adjacent the face of a disk 38 which is rotated by an input shaft 40 which in turn is rotated by a member of the vehicle drive train such as, for example, a vehicle rear wheel. Consequently, the rate of rotation of the disk 38 is directly proportional to the speed of the vehicle. The disk 38 is magnetized so as to have alternating north and south magnetic poles therearound. Upon rotation of the disk 38, the reed switch 34 is alternately opened and closed thereby at a rate directly proportional to the speed of rotation of the input shaft 40 and, consequently, the speed of the vehicle. During the time period the reed switch 34 is closed, the transistor 26 is biased into conduction and, conversely, when the reed switch 34 is opened, the transistor 26 is biased into nonconduction. Consequently, the output of the signal conditioner as taken across the resistor 28 is a square waveform having a frequency directly proportional to the speed of rotation of the disk 38 or the speed of the vehicle.

The collector electrode of the transistor 26 is coupled to the base electrode of a PNP transistor 42 through a differentiating capacitor 44, a diode 46 and a resistor 48. When the transistor 26 is biased into conduction, the output across the resistor 28 is differentiated by the capacitor 44 which results in a positive pulse which is applied to the base electrode of the transistor 42 through the diode 46 and the resistor 48. When the transistor 26 is biased into nonconduction, the capacitor 44 is discharged from the cathode of the Zener diode 21 through a diode 50 and to ground through the resistor 28. The diode 46 prevents a negative pulse from being applied to the base electrode of the transistor 42. The base electrode of the transistor 42 is connected to ground through a resistor 60, its emitter electrode is connected to the cathode of the Zener diode 21 and its collector electrode is connected to ground through a resistor 62. A feedback capacitor 64 and a feedback resistor 66 are coupled between the collector and the base electrodes of the transistor 42. The differentiating capacitor 44 and the transistor 42 and their associated circuitry differentiates the square waveform appearing across the resistor 28 and integrates the positive pulses applied to the base of the transistor 42 to generate a decreasing voltage output at the collector electrode of the transistor 42 which is directly proportional to the increasing speed of the vehicle, the initial output at the collector electrode being equal to the regulated potential at the cathode of the Zener diode 21 when the vehicle speed is zero.

The memory and error amplifier circuit 12 is comprised of a memory capacitor 68 which is connected to the gate electrode of an MOS field effect transistor 70 and to the collector electrode of the transistor 42 through an input resistor 72. The field effect transistor 70 has its drain and substrate electrodes connected to the cathode of the Zener diode 21 and it source electrode connected to ground through an output resistor 74. A set of normally open relay contracts 76 is connected between the gate and source electrodes. The set of normally open relay contacts 76 is controlled by a relay coil 78. One side of the relay coil 78 is connected to ground and the other side is connected to the positive terminal of the DC voltage source 24 through a speed control engage pushbutton 80 and the ignition switch 23 and is connected to the cathode of a diode 82. The anode of the diode 82 is connected to the positive terminal of the DC voltage source 24 through an automatic re-engage pushbutton 84 and the ignition switch 23.

When either the engage pushbutton 80 or the automatic re-engage pushbutton 84 is closed, the relay coil 78 is energized to close the set of normally open relay contacts 76 which connects the gate and source electrodes of the field effect transistor 70. When these electrodes are connected, an output voltage is generated across the output resistor 74. This output is a constant irrespective of the speed of the vehicle when the gate and source electrodes are connected. In addition, when the set of normally open relay contacts 76 are closed, the memory capacitor 68 is charged through the resistors 72 and 74 to a potential equal to the output of the speed tachometer 10 at the collector electrode of the transistor 42. Since the output voltage across the resistor 74 is constant when the set of normally open relay contacts 76 are closed, which output is applied to the gate electrode of the field effect transistor 70, a differential charge is placed on the capacitor 68 which is a direct function of the output of the speed tachometer 10 and consequently the speed of the vehicle. Due to the very high input impedance of the gate of the field effect transistor 70, this charge is maintained by the capacitor 68 when the relay coil 78 is deenergized and the set of normally open relay contacts 76 are opened. Thereafter, when the normally open contacts 76 are opened, the potential on the gate of the field effect transistor 70 varies as a function of the output of the speed tachometer 10 to vary the conduction of the field effect transistor 70 and the output thereof across the resistor 74 as a direct function of the variations in the speed of the vehicle from the memorized speed as represented by the differential charge across the capacitor 68.

The duty cycle oscillator 18 includes an NPN transistor 86 having its base electrode connected to the source of the field effect transistor 70 through a resistor 88, its collector electrode connected to the positive terminal of the DC voltage source 24 through a resistor 90, a set of normally open relay contacts 92, a brake switch 94 and the ignition switch 23. The brake switch 94 is normally closed and is adapted to be opened upon the actuation of the vehicle brakes. The emitter electrode of the transistor 86 is connected to the junction between a resistor 96 and a resistor 98 which are connected in series across the DC voltage source 24 when the set of normally open relay contacts 92, the brake switch 94 and the ignition switch 23 are closed. A feedback capacitor 100 connects the base electrode of the transistor 86 to the collector electrode thereof to form an integrator which integrates the input to the base electrode.

The duty cycle oscillator 18 is also comprised of a flip-flop including an NPN transistor 102 and a PNP transistor 104. The collector electrode of the transistor 102 is connected to the base electrode of the transistor 104 through a resistor 106 and the emitter electrode thereof is connected to ground through the resistor 98. The base electrode of the transistor 102 is connected to ground through a resistor 108 and receives an input from the collector electrode of the transistor 86 through a resistor 110. The emitter electrode of the transistor 104 is connected to the positive terminal of the DC voltage source 24 through the set of normally open relay contacts 92, the brake switch 94 and the ignition switch 23 and its collector electrode connected to ground through a solenoid 112 in the speed actuator 20. The collector electrode of the transistor 104 supplies regenerative feedback to the base electrode of the transistor 102 through a resistor 114. This results in a hysteresis switching action of the transistor 102. In addition, feedback from the collector electrode of the transistor 104 is supplied to the base electrode of the transistor 86 through a resistor 116.

The output of the duty cycle oscillator 18 is a rectangular waveform having a duty cycle which is inversely proportional to the magnitude of the input signal thereto from the source electrode of the field effect transistor 70. The circuit values of the duty cycle oscillator 18 are such that when the vehicle is at the memorized speed, the output of the duty cycle oscillator 18 is a signal having a 50 percent duty cycle. As the speed of the vehicle decreases below the memorized speed, the potential at the gate electrode of the field effect transistor 70 decreases to decrease the output thereof across the output resistor 74. The duty oscillator 18 is responsive thereto for generating a rectangular waveform having a duty cycle increasing from 50 percent as a direct function of the decreasing vehicle speed. Conversely, when the vehicle speed increases above the memorized speed, the duty cycle oscillator 18 is responsive to the output of the memory and error amplifier circuit 12 for generating a rectangular waveform having a duty cycle decreasing from 50 percent as the vehicle speed increases above the memorized speed.

The duty cycle oscillator 18 receives operating power through the set of normally open relay contacts 92, the brake switch 94 and the ignition switch 23. The set of normally open relay contacts 92 is controlled by a relay coil 118 which has one side connected to the cathode of the diode 120 whose anode is connected to the DC voltage source 24 through the normally open contacts 92, the brake switch 94, and the ignition switch 23 and to the cathode of a diode 122 whose anode is connected to the cathode of the diode 82 and to the DC voltage source 24 through the engage pushbutton 80 and the ignition switch 23. The other side of the relay coil 118 is connected to the collector electrode of an NPN transistor 124 in the speed switch 14. The speed switch 14 is comprised of a transistor 126 which receives an input to its base electrode from the collector electrode of the transistor 42 in the speed tachometer 10 through a resistor 128. The emitter electrode of the transistor 126 is connected to the cathode of the Zener diode 21 and its collector electrode is connected to the base electrode of the transistor 124 through a resistor 130. The emitter electrode of the transistor 124 is connected to ground.

As the speed of the vehicle increases from zero, the output of the speed tachometer 10 at the collector electrode of the transistor 42 decreases until a speed is reached at which the transistor 126 is biased into conduction, which in turn biases the transistor 124 into conduction. This speed is the minimum speed at which the vehicle can be controlled. When the vehicle speed is above that minimum speed, power can be supplied to the duty cycle oscillator 18 by closing either the engage pushbutton 80 or the automatic re-engage pushbutton 84 to connect the positive terminal of the DC voltage source 24 to the relay coil 118 which is energized through the transistor 124. The energization of the relay coil 118 closes the set of normally open contacts 92 which latches the relay coil 118 so as to continually supply operating power to the duty cycle oscillator 18 until the relay coil 118 is deenergized by the opening of the brake switch 94 upon the actuation of the vehicle brakes. As previously indicated, the closure of the engage pushbutton 80 or the closure of the automatic re-engage pushbutton 84 also energizes the relay coil 78 to close the set of normally open relay contacts 76 so as to memorize the speed at which the vehicle is moving at the time the pushbutton 80 or 84 was closed.

The speed actuator 20 includes the solenoid 112 which receives an input from the duty cycle oscillator 18. A mixing chamber 132 has a conduit 134 through which vacuum is admitted from a vacuum source, which may be, for example, the vehicle manifold vacuum, upon the energization of a normally closed electromagnetic valve 135 and a conduit 136 through which atmospheric air is admitted. The electromagnetic valve 135 is connected to and is energized by the DC power source 24 through the set of normally open relay contacts 92, the brake switch 94 and the ignition switch 23. Therefore, vacuum is admitted to the mixing chamber 132 only while the vehicle speed control system is engaged. A valve member 138 is pivotally secured to a shaft 139 and is biased to a first position against a stop 140 by a spring member 141 so as to admit atmospheric air through the conduit 136. The valve member 138 is moved against the bias of the spring 141 by the solenoid 112, when energized, so as to close the atmospheric air input through the conduit 136. The mixing chamber 132 is connected to a pneumatic motor 142 which is comprised of a diaphragm 144 and a spring 146. The diaphragm 144 is connected to a vehicle throttle 148 by means of a link 150. As the pressure within the mixing chamber 132 is decreased, the diaphragm 144 is moved against the force of the spring 146 so as to move the link 150 and the attached throttle 148 to an open position. The throttle 148 is a conventional vehicle internal combustion engine throttle biased toward the closed position and is operative when opened to effect an increase in the speed of the vehicle.

The pressure within the mixing chamber 132 is a function of the percentage time period that the valve member 138 is moved to close the atmospheric air input through the conduit 136. As can be seen, therefore, the pressure within the mixing chamber 132 is a function of the duty cycle of the rectangular waveform input to the solenoid 112 from the duty cycle oscillator 18.

As the speed of the vehicle decreases below the speed memorized by the capacitor 68 in the memory and error amplifier circuit 12, the duty cycle of the rectangular waveform at the output of the duty cycle oscillator 18 increases, as previously described. Consequently, the percentage time period that the conduit 136 is closed off increases to decrease the pressure within the mixing chamber 132 to a value to cause the diaphragm 144 to move against the return force of the spring 146 and open the vehicle throttle 148 to a position which will maintain the memorized speed. Conversely, when the speed of the vehicle increases above the memorized speed, the duty cycle of the rectangular waveform at the output of the duty cycle oscillator 18 decreases to increase the pressure within the mixing chamber 132, which permits the spring 146 to move the diaphragm 144 in a direction to close the vehicle throttle 148 to a position to maintain the desired memorized speed.

The electronic speed control system described is engaged to maintain the vehicle speed, when the speed is above the minimum speed as determined by the speed switch 14, in the manner described when either the engage pushbutton 80 or the automatic re-engage pushbutton 84 is actuated. The system is disengaged by the actuation of the vehicle brakes to open the brake switch 94 to deenergize the relay coil 118 and open the set of normally open relay contacts 92. Operating power to the duty cycle oscillator 18 is thereby removed. Consequently, the solenoid 112 is continually deenergized to permit the pressure within the mixing chamber 132 to increase to atmospheric pressure, resulting in the closing of the vehicle throttle 148 to decrease the vehicle speed. When the speed control system is disengaged, the former cruising speed is continuously memorized by the capacitor 68 in the memory and error amplifier circuit 12 until the relay coil 78 is energized to close the set of normally open relay contacts 76 by the actuation of either the engage pushbutton 80 or the automatic re-engage pushbutton 84, at which time a new vehicle speed is memorized by the capacitor 68.

The automatic re-engage circuit for the foregoing speed control system will now be described. The automatic re-engage circuit 16 includes an NPN transistor 150 having its collector electrode connected to the cathode of the Zener diode 21, its emitter electrode connected to ground through a resistor 152, and its base electrode connected to the source electrode of the field effect transistor 70 in the memory and error amplifier circuit 12. The emitter electrode of the transistor 150 is also connected to the base electrode of a PNP transistor 154 through a resistor 156 and to the positive terminal of the DC voltage source 24 through a resistor 158, the set of normally open relay contacts 92, the brake switch 94 and the ignition switch 23. The emitter electrode of the transistor 154 is connected to the junction between series connected resistors 160 and 162 which are connected in parallel with the Zener diode 21. The collector electrode of the transistor 154 is connected to the base electrode of an NPN transistor 164 through a resistor 166. The emitter electrode of the transistor 164 is connected to ground and its collector electrode is connected to the base electrode of the transistor 154 through a feedback resistor 168 and to the positive terminal of the DC voltage source 24 through a resistance portion 170 of a potentiometer 171, and a set of normally open relay contacts 172 and the ignition switch 23. An NPN transistor 174 has its base electrode connected to the source electrode of the field effect transistor 70 in the memory and error amplifier circuit 12 through a resistor 176, its emitter electrode connected to a wiper arm 178 of the potentiometer 171 and its collector electrode connected to the base electrode of a PNP transistor 180 through a resistor 182 and to the positive terminal of the DC voltage source 24 through a resistor 184, the set of normally open relay contacts 172 and the ignition switch 23. The collector electrode of the transistor 180 is connected to ground through an output resistor 186 and to ground through a diode 188, the relay coil 118 and the transistor 124 in the speed switch 14. The emitter electrode of the transistor 180 is connected to the positive terminal of the DC voltage source 24 through the set of normally open relay contacts 172 and the ignition switch 23. The set of normally open relay contacts 172 are controlled by a relay coil 190 which has one side connected to ground and the other side connected to the DC voltage source 24 through the set of normally open relay contacts 172 and the ignition switch 23 and to the cathode of a diode 192 whose anode is connected to the positive terminal of the DC voltage source 24 through the automatic re-engage pushbutton 84 and the ignition switch 23.

The relay coil 190 is energized upon the actuation of the automatic re-engage pushbutton 84 through the diode 192 to close the set of normally open relay contacts 172 to supply operating power to the automatic re-engage circuit 16. The relay coil 190 is thereafter latched and energized through the set of normally open relay contacts 172 which are maintained closed to supply the potential of the DC power source 24 to the automatic re-engage circuit 16. The relay coil 190 is thereafter deenergized when the ignition switch 23 is opened.

When the speed control system is engaged by the actuation of the engage pushbutton 80, the relay coil 190 is not energized and latched due to the blocking action of the diode 82. Consequently, the vehicle operator may, if desired, engage the speed control system while yet maintaining the automatic re-engage circuit 16 inoperative by actuating the engage pushbutton 80 or may engage the speed control system and render the automatic re-engage circuit operative by actuating the automatic re-engage pushbutton 84.

When the vehicle speed is being controlled at a desired cruise speed by the speed control system previously described subsequent to the actuation of the automatic re-engage pushbutton 84, the voltage divider circuit comprised of the resistors 152 and 158 maintains a bias on the emitter electrode of the transistor 150 which is greater than the output of the memory and error amplifier circuit 12 at the source electrode of the field effect transistor 70 which is applied to the base electrode of the transistor 150. Therefore, the transistor 150 is biased into nonconduction. Also, the bias on the base electrode of the transistor 154, as determined by the resistors 152 and 158, is greater than the bias on the emitter electrode of the transistor 154 as determined by the voltage divider comprised of the resistors 160 and 162. Therefore, the transistor 154 is biased into nonconduction. Consequently, the transistors 164, 174 and 180 are also biased into nonconduction. If the vehicle operator actuates the brakes of the vehicle, the brake switch 94 is opened to deenergize the relay coil 118 and open the set of normally open relay contacts 92. The bias on the emitter electrode of the transistor 150 as determined by the resistors 152 and 158 is removed and the transistor 150 is biased into conduction by the bias on the base electrode thereof from the output of the memory and error amplifier circuit 12. The conduction of the transistor 150 maintains a bias on the base electrode of the transistor 154 which remains biased into nonconduction. Upon the opening of the set of normally open relay contacts 92, the duty cycle oscillator 18 and the speed actuator 20 are rendered inoperative to maintain the speed of the vehicle as previously described. The resulting decrease in the speed of the vehicle results in a decrease in the output of the memory and error amplifier 12. The conduction of the transistor 150 is decreased in response thereto which decreases the bias on the base electrode of the transistor 154. At some speed below the memorized speed, the transistor 154 will begin to conduct to bias the transistor 164 into conduction. As the transistor 164 begins to conduct, current which was previously supplied to the base electrode of the transistor 154 through the resistance portion 170 of the potentiometer 171 and the resistor 168 changes direction. Current then flows from the base electrode of the transistor 154 through the resistor 168 and the transistor 164 to ground to cause the potential at the base electrode of the transistor 154 to decrease yet further which results in a fast switching action of the transistors 154 and 164. As a result of the bias on the emitter electrode of the transistor 174 due to the resistance portion 170 of the potentiometer 171 and the decreased potential at the output of the memory and error amplifier 12 which is applied to the base electrode of the transistor 174 through the resistor 176, the transistors 174 and 180 remain biased into nonconduction. The automatic re-engage circuit 16 is now armed.

When the vehicle speed is manually increased subsequent to the arming of the automatic re-engage circuit 16, the output of the memory and error amplifier circuit 12 is increased with a resulting increase in the bias on the base electrode of the transistor 174. As the speed approaches the former cruise speed, which is memorized by the capacitor 68, the bias on the base electrode of the transistor 174 exceeds its emitter electrode bias which results in the conduction of the transistors 174 and 180. Upon the conduction of the transistor 180, the potential of the DC voltage source 24 is applied to the relay coil 118 through the diode 188, the latter being reenergized to close the relay contacts 92 to again supply operating power to the duty cycle oscillator 18 and the speed actuator 20 which are thereafter operative to maintain the speed of the vehicle at the former cruising speed.

As the speed of the vehicle was increased to the former cruise speed, the increase in the output of the memory and error amplifier circuit 12 did not affect the conduction of the transistor 154 as a result of the hysteresis effect caused by the feedback through the resistor 168. Upon the reenergization of the relay coil 118, the bias on the base electrode of the transistor 154 and the emitter electrode of the transistor 150 as determined by the resistors 152 and 158 is sufficient to again bias the transistors 150 and 154 into nonconduction to bias the transistors 164, 174 and 180 into nonconduction. automatic re-engage circuit 16 is now in its original condition.

As can be seen, the automatic re-engage circuit 16 enables the vehicle speed control system as the vehicle speed approaches the former cruise speed from a lower speed, but not from a higher speed. Thus, momentary actuation of the brake switch 94 will disengage the speed control system and automatic re-engagement will not occur until the vehicle has slowed sufficiently to arm the automatic re-engage circuit 16 as previously described, and is then accelerated to the former cruise speed.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A speed control system for an automotive vehicle having power means for moving the vehicle at varying or constant speeds comprising sensing means responsive to the speed of the vehicle for generating an output signal related to said speed; memory means connected to the sensing means, the memory means being operative when enabled for memorizing the speed of the vehicle as represented by the output signal of the sensing means; means connected to the memory means for enabling the latter when the vehicle is at the desired speed; speed error detecting means connected to the memory means and responsive to the variation of the speed of the vehicle from the memorized speed for generating an output signal related to said variations; actuating means connected to the speed error detecting means and the power means and responsive to the output signal of the speed error detecting means for controlling the power means in a speed maintaining manner; means for disabling the actuating means to allow the vehicle speed to decrease below the memorized speed; bistable circuit means shiftable between first and second states connected to the speed error detecting means and responsive to the output signal thereof for changing from the first state to the second state when the vehicle is at a predetermined speed less than the memorized speed; and circuit means connected to the bistable circuit means, the speed error detecting means and the actuating means and responsive to the output signal of the speed error detecting means and the state of the bistable means for enabling the actuating means to again control the power means in a speed maintaining manner when the bistable means is in the second state and the speed of the vehicle is increased to the memorized speed.

2. A speed control system for a throttle control automotive vehicle comprising sensing means responsive to the speed of the vehicle for generating an output signal related to said speed; memory means connected to the sensing means, the memory means being operative when enabled for memorizing the speed of the vehicle as represented by the output signal of the sensing means; speed error detecting means connected to the memory means and responsive to the variations of the speed of the vehicle from a memorized speed for generating an output signal related to said variations; actuating means connected to the speed error detecting means and the throttle and responsive to the output signal of the speed error detecting means for operating the throttle in a speed maintaining manner when the actuating means is supplied with operating power; a source of power; latching means connected to the actuating means and to the source of power for supplying power to the actuating means when the latching means is latched; engaging means connected to the memory means and to the latching means for enabling the memory means and latching the latching means when the vehicle is at the desired speed; means for unlatching the latching means to allow the vehicle to decrease below the memorized speed; bistable circuit means shiftable between first and second states connected to the speed error detecting means and responsive to the output signal thereof for changing from the first state to the second state when the vehicle is at a predetermined speed less than the memorized speed; circuit means connected to the bistable circuit means, the speed error detecting means and the latching means and responsive to the output signal of the speed error detecting means and the state of the bistable means for latching the latching means so as to enable the actuating means to again operate the throttle in a speed maintaining manner when the bistable means is in the second state and the speed of the vehicle is increased to the memorized speed; and means connected to the bistable circuit means and the latching means for shifting the bistable circuit means from the second state to the first state when the latching means is latched.

3. A speed control system for a throttle controlled automotive vehicle comprising sensing means responsive to the speed of the vehicle for generating an output signal related to said speed; memory means connected to the sensing means, the memory means being operative when enabled for memorizing the speed of the vehicle as represented by the output signal of the sensing means; speed error detecting means connected to the memory means and responsive to the variations of the speed of the vehicle from a speed memorized by the memory means for generating an output signal related to said variations; actuating means connected to the speed error detecting means and the throttle and responsive to the output signal of the speed error detecting means for operating the throttle in a speed maintaining manner when said actuating means is supplied with operating power; a source of power; first latching means connected to the source of power and the actuating means for supplying operating power to the actuating means when said latching means is latched; engaging means connected to the memory means, the actuating means and the source of power for enabling the memory and latching the first latching means when the vehicle is at the desired speed, the actuating means being responsive to the output signal of the speed error detecting means for operating the throttle so as to maintain said speed; means for unlatching the first latching means to allow the vehicle speed to decrease below the memorized speed; bistable circuit means shiftable between first and second states connected to the speed error detecting means and responsive to the output signal thereof for changing from the first state to the second state when the vehicle is at a predetermined speed less than the memorized speed; circuit means connected to the bistable circuit means, the speed error detecting means and the first latching circuit and responsive to the output signal of the speed error detecting means and the state of the bistable means for latching the first latching means when the bistable means is in the second state, the speed of the vehicle is increased to the memorized speed and the circuit means is supplied with operating power; second latching means connected to the source of power and the circuit means for supplying operating power to the circuit means when said second latching means is latched; and automatic re-engage means connected to the memory means, the first latching means and the second latching means for enabling the memory means and latching the first and second latching means so as to supply operating power to the actuating means and the circuit means, whereby the speed control system is operative upon the actuation of the engage means at the desired speed for maintaining the vehicle at the desired speed and is operative when the automatic re-engage means is actuated at the desired speed for maintaining the vehicle at the desired speed and for automatically re-engaging the speed control system when the first latching means is disabled and the vehicle has decreased to a predetermined speed less than the memorized speed and is then accelerated to the memorized speed.

* * * * *